United States Patent
Zacerkowny et al.

(10) Patent No.: US 11,053,150 B2
(45) Date of Patent: Jul. 6, 2021

(54) WASTEWATER TREATMENT SYSTEM AND METHOD

(71) Applicant: Evoqua Water Technologies LLC, Pittsburgh, PA (US)

(72) Inventors: Orest Zacerkowny, Mississauga (CA); Argun O. Erdogan, Greenfield, WI (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 0 days.

(21) Appl. No.: 16/603,046

(22) PCT Filed: Apr. 6, 2018

(86) PCT No.: PCT/US2018/026371
§ 371 (c)(1),
(2) Date: Oct. 4, 2019

(87) PCT Pub. No.: WO2018/187639
PCT Pub. Date: Oct. 11, 2018

(65) Prior Publication Data
US 2020/0189948 A1    Jun. 18, 2020

Related U.S. Application Data

(60) Provisional application No. 62/482,328, filed on Apr. 6, 2017.

(51) Int. Cl.
*C02F 9/00* (2006.01)
*C02F 1/24* (2006.01)
(Continued)

(52) U.S. Cl.
CPC ............... *C02F 9/00* (2013.01); *C02F 1/24* (2013.01); *C02F 3/1273* (2013.01); *C02F 3/301* (2013.01); *C02F 3/302* (2013.01); *C02F 11/04* (2013.01)

(58) Field of Classification Search
CPC .. C02F 9/00; C02F 1/24; C02F 3/1273; C02F 3/301; C02F 3/302; C02F 11/04; C02F 1/286; C02F 1/5245; Y02W 10/10
(Continued)

(56) References Cited

U.S. PATENT DOCUMENTS

| 4,013,552 A | 3/1977 | Kreuter |
| 6,398,921 B1 | 6/2002 | Moraski |

(Continued)

FOREIGN PATENT DOCUMENTS

| WO | 2011106621 A2 | 9/2011 |
| WO | 2017214003 A1 | 12/2017 |
| WO | 2019036598 A1 | 2/2019 |

OTHER PUBLICATIONS

Wikipedia, "Sewage," Jan. 20, 2017, p. 1 para[0001]; https://en.wikipedia.org/w/index.php?title-Sewage&oldid=760953273.
International Search Report for corresponding PCT/US2018/46883, dated Nov. 8, 2018.

(Continued)

*Primary Examiner* — Fred Prince

(57) ABSTRACT

Systems and methods for treating wastewater including a contact tank configured to mix influent wastewater with activated sludge to form a mixed liquor, a dissolved air flotation unit having an inlet and an outlet, the inlet of the dissolved air flotation unit in fluid communication with an outlet of the contact tank, and a membrane bioreactor including a biological treatment vessel having an inlet in fluid communication with the outlet of the dissolved air flotation unit and an activated sludge outlet in fluid communication with an inlet of the contact tank.

29 Claims, 4 Drawing Sheets

(51) Int. Cl.
*C02F 3/12* (2006.01)
*C02F 3/30* (2006.01)
*C02F 11/04* (2006.01)

(58) Field of Classification Search
USPC ....... 210/603, 605, 621, 622, 623, 630, 252, 210/259, 903
See application file for complete search history.

(56) References Cited

U.S. PATENT DOCUMENTS

| | | | |
|---|---|---|---|
| 7,473,364 B2 | 1/2009 | Abu-Orf | |
| 7,713,413 B2 | 5/2010 | Barnes | |
| 2008/0169245 A1 | 7/2008 | Roa-Espinosa et al. | |
| 2011/0203992 A1* | 8/2011 | Liu | C02F 3/28 |
| | | | 210/607 |
| 2012/0043277 A1* | 2/2012 | Smith | C02F 3/302 |
| | | | 210/605 |
| 2013/0213883 A1* | 8/2013 | Josse | C02F 11/04 |
| | | | 210/630 |
| 2014/0001119 A1 | 1/2014 | Woodard | |
| 2016/0083268 A1 | 3/2016 | Erdogan | |
| 2016/0102006 A1 | 4/2016 | Blumenschein | |
| 2016/0130164 A1* | 5/2016 | Whittier | C02F 3/307 |
| | | | 210/605 |
| 2016/0200609 A1 | 7/2016 | Erdogan et al. | |

OTHER PUBLICATIONS

Minden Gardnerville Sanitation District, "Glossary of Wastewater Terms," http://www.mgsdistrict.org/wpcontent/uploads/2011/11/Glossary-of-Wastewater-Terms.pdf, p. 6, para. 4, Nov. 12, 2011.
Mulder, Lonneke, "Extended European Search Report", European Patent Application No. 18781612.9, dated Nov. 23, 2020, 8 pages.
Unknown, "Communication pursuant to Rules 70(2) and 70a(2) EPC", European Patent Application No. 18781612.9, dated Dec. 10, 2020, 1 page.
Copenheaver, Blaine R., "Written Opinion of the International Searching Authority", International Application No. PCT/US2018/026371, dated Jun. 1, 2018, 7 pages.
Copenheaver, Blaine R., "International Search Report", International Application No. PCT/US2018/026371, dated Jun. 1, 2018, 2 pages.
Baharlou, Simin, "International Preliminary Report on Patentability", International Application No. PCT/US2018/026371, dated Oct. 8, 2019, 8 pages.

* cited by examiner

WASTEWATER TREATMENT SYSTEM AND METHOD

RELATED APPLICATIONS

This application claims priority under 35 U.S.C. § 119(e) to U.S. Provisional Application Ser. No. 62/483,328, titled "WASTEWATER TREATMENT SYSTEM AND METHOD," filed on Apr. 6, 2017, which is herein incorporated by reference in its entirety.

BACKGROUND

Aspects and embodiments of the present invention are generally directed to wastewater treatment systems and processes.

SUMMARY

In accordance with an embodiment of the present invention there is provided a wastewater treatment system. The wastewater treatment system comprises a contact tank having a first inlet configured to receive wastewater to be treated, a second inlet, and an outlet, the contact tank configured to mix the wastewater to be treated with activated sludge to form a mixed liquor, a dissolved air flotation unit having an inlet in fluid communication with the outlet of the contact tank, a first outlet, and a second outlet, and a membrane bioreactor including: a biological treatment vessel having a first inlet in fluid communication with the first outlet of the dissolved air flotation unit, a second inlet, an activated sludge outlet in fluid communication with the second inlet of the contact tank, and a membrane filtration unit disposed within the biological treatment vessel, the membrane filtration unit comprising a plurality of porous membranes and a filtrate outlet, the membrane bioreactor configured to biologically treat organic components of an effluent from the dissolved air flotation unit to form a biologically treated mixed liquor and filter the biologically treated mixed liquor to produce a filtrate.

In accordance with some aspects of the wastewater treatment system, the contact tank further comprises a second outlet in fluid communication with the second inlet of the membrane bioreactor.

In accordance with some aspects of the wastewater treatment system, the membrane bioreactor includes an aerated anoxic treatment region and an aerobic treatment region.

In accordance with some aspects of the wastewater treatment system, the first inlet of the membrane bioreactor is configured to deliver the effluent from the dissolved air flotation unit to the aerobic treatment region.

In accordance with some aspects of the wastewater treatment system, the second inlet of the membrane bioreactor is configured to deliver a portion of the mixed liquor from the contact tank to the aerated anoxic treatment region.

In accordance with some aspects of the wastewater treatment system, the aerobic treatment region is fluidically connected to an outlet of the aerated anoxic treatment region.

In accordance with some aspects of the wastewater treatment system, the membrane filtration unit is disposed in the aerobic treatment region.

In accordance with some aspects of the wastewater treatment system, the wastewater treatment system further includes an anaerobic digester having an inlet in fluid communication with the second outlet of the dissolved air flotation unit, a first outlet, and a second outlet, the anaerobic digester configured to anaerobically digest a first portion of suspended matter from the dissolved air flotation unit to form a biogas and anaerobically treated sludge.

In accordance with some aspects of the wastewater treatment system, the second outlet of the dissolved air flotation unit is in fluid communication with a third inlet of the contact tank, the dissolved air flotation unit being configured to deliver a second portion of the suspended matter to the third inlet of the contact tank.

In accordance with some aspects of the wastewater treatment system, the wastewater treatment system is configured to operate utilizing energy generated from the biogas.

In accordance with some aspects of the wastewater treatment system, a total surface area of the plurality of porous membranes to produce a given flux of filtrate is reduced as compared to a total surface area of a plurality of porous membranes of a membrane filtration unit in a substantially similar wastewater treatment system not comprising the contact tank and the dissolved air flotation unit.

In accordance with some aspects of the wastewater treatment system, a volume of the membrane bioreactor is reduced as compared to a substantially similar wastewater treatment system not comprising the contact tank and the dissolved air flotation unit.

In accordance with some aspects of the wastewater treatment system, the membrane bioreactor is configured to have a sludge retention time of less than 20 days.

In accordance with some aspects of the wastewater treatment system, the membrane bioreactor is configured to have a sludge retention time of less than 8 days.

In accordance with some aspects of the wastewater treatment system, the membrane bioreactor is configured to have a sludge retention time of about 5 days or less.

In accordance with an embodiment of the present invention there is provided a method of treating wastewater in a wastewater treatment system. The method comprises introducing the wastewater into a contact tank including an activated sludge, mixing the wastewater with the activated sludge in the contact tank to form a mixed liquor, directing a first portion of the mixed liquor to a dissolved air flotation unit, separating the mixed liquor in the dissolved air flotation unit to form a dissolved air flotation unit effluent and separated biosolids, directing the dissolved air flotation unit effluent to a membrane bioreactor, biologically treating the dissolved air flotation unit effluent in the membrane bioreactor to form a biologically treated mixed liquor, filtering the biologically treated mixed liquor in the membrane bioreactor to form a filtrate and an activated sludge, and recycling a first portion of the activated sludge to the contact tank.

In some embodiments, the method further includes directing a second portion of the mixed liquor into the membrane bioreactor and biologically treating the second portion of the mixed liquor with the dissolved air flotation unit effluent to form the biologically treated mixed liquor.

In some embodiments, the membrane bioreactor includes an aerated anoxic treatment region and an aerobic treatment region and the method further comprises directing the effluent from the dissolved air flotation unit to the aerobic treatment region.

In some embodiments, the method further includes directing a portion of the mixed liquor from the contact tank to the aerated anoxic treatment region.

In some embodiments, the method further includes treating the effluent from the dissolved air flotation unit in the aerobic treatment region to form a biologically treated aerobic mixed liquor and directing the biologically treated aerobic mixed liquor to the aerated anoxic treatment region.

In some embodiments, the method further includes treating the biologically treated aerobic mixed liquor in the aerated anoxic treatment region to form the biologically treated mixed liquor.

In some embodiments, the method further includes treating a first portion of the separated biosolids in an anaerobic digester to produce a biogas and an anaerobically treated sludge.

In some embodiments, the method further includes recycling a second portion of the separated biosolids to the contact tank.

In some embodiments, the method further includes comprising generating energy from the produced biogas.

In some embodiments, the method further includes powering one or more components of the wastewater treatment system with the generated energy. In some embodiments, the generated energy is sufficient for the wastewater treatment system to operate energy neutral.

In some embodiments, recycling the first portion of the activated sludge to the contact tank results is in an amount sufficient to reduce a total surface area of the plurality of porous membranes to produce a given flux of filtrate as compared to a total surface area of a plurality of porous membranes of a membrane filtration unit in a substantially similar method of treating wastewater that does not comprise recycling the first portion of the activated sludge to the contact tank.

In some embodiments, the method further includes recycling a portion of the dissolved air flotation unit effluent to the dissolved air flotation unit.

In some embodiments, the dissolved air flotation unit effluent is biologically treated for a retention time of less than 20 days.

In some embodiments, the dissolved air flotation unit effluent is biologically treated for a retention time of less than 8 days.

In accordance with another embodiment of the present invention there is provided a method of facilitating increased flux in a membrane bioreactor in a wastewater treatment system. The method comprises configuring a dissolved air flotation unit in the wastewater treatment system in fluid communication between a contact tank and the membrane bioreactor to remove solids from a mixed liquor output from the contact tank prior to entering the membrane bioreactor, and recycling at least a portion of an activated sludge from the membrane bioreactor to the contact tank.

In accordance with some aspects, recycling the at least a portion of the activated sludge to the contact tank reduces a solids load to the membrane bioreactor as compared to the wastewater treatment system operating in the absence of recycling the at least a portion of activated sludge to the contact tank.

In accordance with some aspects, the method further includes recycling at least a portion of the removed solids from the dissolved air flotation unit to the contact tank.

In accordance with another embodiment of the present invention there is provided a method of facilitating wastewater treatment in a wastewater treatment system having a membrane bioreactor. The method comprises fluidly connecting an activated sludge outlet of the membrane bioreactor to an inlet of a contact tank, fluidly connecting a source of wastewater to the inlet of the contact tank, fluidly connecting an inlet of a dissolved air flotation unit to a mixed liquor outlet of the contact tank, and fluidly connecting a dissolved air flotation unit effluent outlet to an inlet of the membrane bioreactor.

In accordance with some aspects, the method further includes fluidly connecting a dissolved air flotation unit separated biosolids outlet to an inlet of an anaerobic digester.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments," "certain embodiments," or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
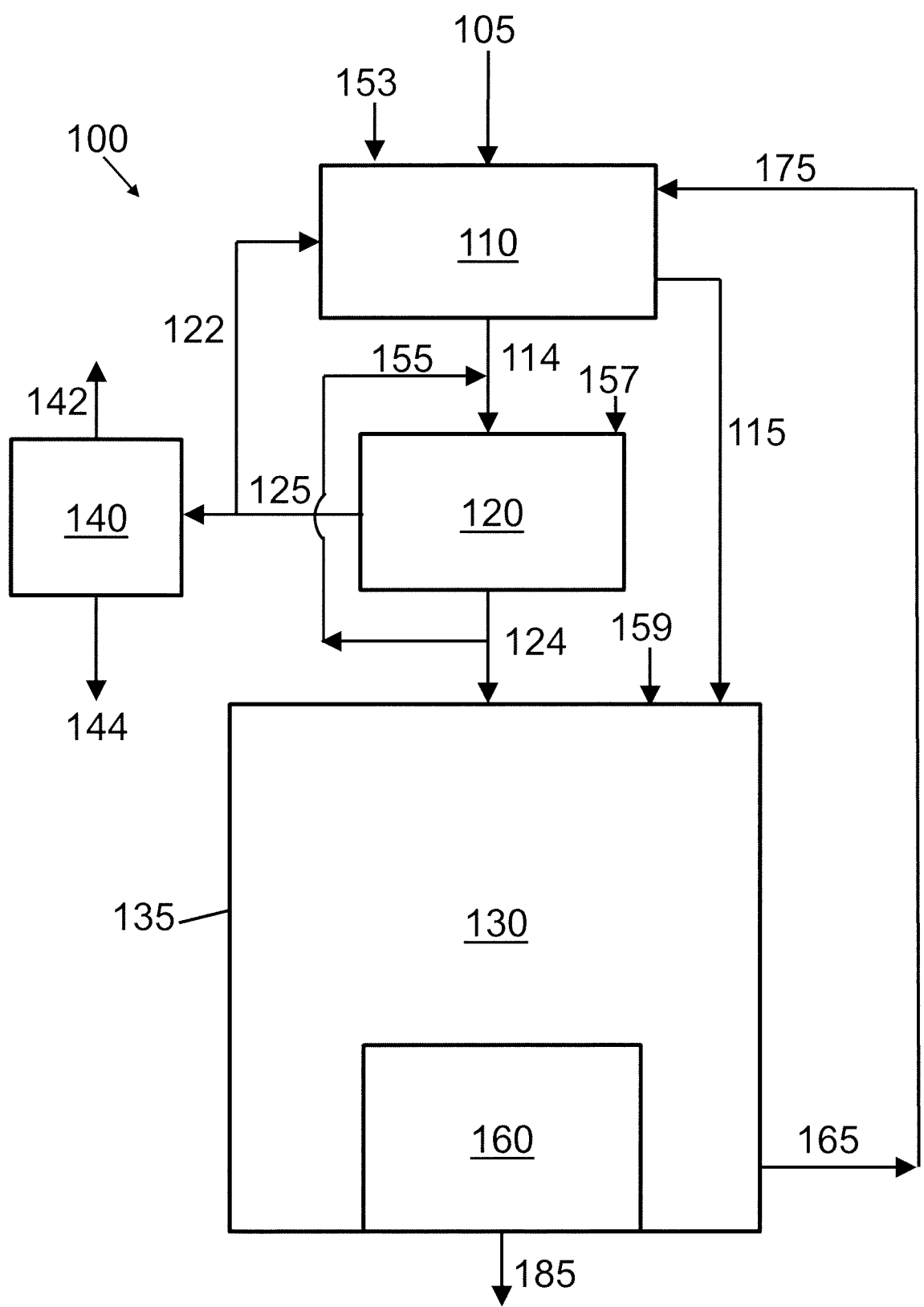
FIG. 1 is a block flow diagram of a wastewater treatment system in accordance with an embodiment of the present invention.

Wastewater generated by municipalities and industry is commonly collected and routed to a treatment facility for the removal of a variety of physical, chemical and biological pollutants prior to being discharged into a receiving body of water. Many public and private treatment facilities employ both physical and biological treatment methods to achieve the required level of treatment. Physical methods, such as screening, grit removal, and physical settling processes, are effective for the removal of larger and heavier solids in the wastewater. However, lighter, smaller solids and other soluble pollutants in the wastewater resist removal by physical methods. For these pollutants, biological treatment methods such as suspended growth systems (e.g., activated sludge, membrane bioreactors (MBRs)) or fixed film systems (e.g., trickling filters, moving bed bioreactors (MBBRs), rotating biological conductors (RBCs)) are commonly employed.

Regulation of pollutant discharges from municipal wastewater treatment systems has become more stringent in recent years. In response, many municipalities have deployed new wastewater treatment systems or retrofitted existing systems to reduce pollutant discharge. Pollutants can be of many forms with the most common being Biochemical Oxygen Demand (BOD), Chemical Oxygen Demand (COD), Total Suspended Solids (TSS), ammonia, total nitrogen, nitrate, nitrite and phosphorous.

Biological treatment systems, such as conventional activated sludge systems and membrane bioreactors are one method to reduce the pollutants in a wastewater influent. Biological treatment systems are designed and operated to retain an adequate amount of activated sludge (microorganisms) such that the pollutant load contained in the water treated by the system will be adequately reduced. The amount of activated sludge produced is related to the Solids Retention Time (SRT) of the system. SRT is associated with the time spent by microorganisms in the system, or the time available for microorganisms to reproduce, and may also be referred to as the mean cell retention time (MCRT) or sludge age. Each microorganism has a characteristic regeneration time that depends on many factors. If the SRT is longer than the regeneration time of a particular organism, it will proliferate. Otherwise, it will be washed out of the system. The minimum SRT represents the value below which a particular group of microorganisms is unable to grow in a suspended growth bioreactor. The minimum SRT required to treat various pollutants under various conditions is therefore dependent on several factors, including the influent concentration of the limiting substrate for the microorganisms of interest and the kinetic parameters describing their growth on that substrate. Conventional methods for controlling SRT include adjusting the sludge wasting rate based on the food-to-microorganism (F/M) ratio or mixed liquor suspended solids (MLSS) concentration.

Conventional activated sludge systems retain activated sludge by the use of solid/liquid separation devices, such as clarifiers, and can maintain adequate SRTs to treat pollutants provided that the flow of the activated sludge concentration and settleability of the activated sludge going to the settling basins or clarifiers are within reasonable limits set by design parameters. These design parameters often depend upon the area of the settling basins or clarifiers and the characteristics of the activated sludge. Membrane bioreactor systems retain the activated sludge by the use of membrane filtration equipment and can operate successfully at significantly higher activated sludge concentrations than typical for conventional activated sludge systems.

Membrane bioreactors (MBRs) combine membrane filtering technology and activated sludge biodegradation processes for the treatment of wastewater and therefore offer a hybrid of a conventional biological treatment system and physical liquid-solid separation using membrane filtration. Conventional MBR systems implement the use of immersed or external membranes to filter an activated sludge stream from a bioreactor to produce a high quality effluent. The inclusion of membranes in the system eliminates the need for secondary clarifiers. MBR systems offer several advantages over activated sludge processes (ASPs), including a smaller footprint, higher volumetric loading rates, shorter hydraulic retention times (HRT), higher decomposition rates, a lower rate of sludge production, high-quality effluent, and shorter start-up times. However, MBR systems also have several drawbacks, including higher energy costs, membrane fouling problems, and the potential high costs of periodic membrane replacement.

In some embodiments, the apparatus and methods disclosed herein provide advantages with regard to, for example, capital costs and operational costs as compared to conventional activated sludge processes or conventional MBR applications. In some embodiments a contact tank used in combination with a dissolved air flotation system is included in a main stream of wastewater entering a wastewater treatment system having a membrane bioreactor. The combination of the contact tank and dissolved air flotation device offers a biologically enhanced primary treatment process whereby a significant amount of biological oxygen demand is removed, for example, particulate biological oxygen demand, from wastewater prior to the wastewater entering the membrane bioreactor portion of the wastewater treatment system. This results in either a reduction in the volume of a biological reactor or biomass that is sent to the membrane bioreactor for biological treatment as compared to a conventional membrane bioreactor wastewater treatment system. The reduced organic load allows for the system to operate at a lower sludge retention time and at lower MLSS concentrations. The reduced organic load (and corresponding lower TSS values) also results in reduced membrane fouling, which allows the membrane bioreactor to operate with a smaller footprint and for the membrane filtration unit of the membrane bioreactor to operate with less surface area and a higher flux rate. In addition, the system could be operated at a lower flux rate and lower MLSS concentrations to reduce energy requirement or reduce chemical cleaning of the membranes. The reduced fouling also extends the operating life of the membranes. These advantages reduce the capital costs for the overall system. In addition, utilization of the contact tank and dissolved air flotation system also reduces the requirement for aeration in the biological treatment portion of the membrane bioreactor to effect oxidation of the biological oxygen demand of the wastewater and reduces the amount or volume of chemical used during the chemical cleaning cycle (due to reduced fouling), reducing operating costs. The amount of waste sludge generated by the membrane bioreactor portion of the treatment system is also reduced, reducing the amount of waste which would need to be disposed of or otherwise further treated. The material removed from the wastewater in the contact tank and dissolved air flotation system may be utilized to produce energy, for example, in the form of biogas in a downstream anaerobic digestion system. This provides for an increase in the production of biogas produced as compared to a conventional membrane bioreactor wastewater treatment system that does not include the contact tank and dissolved air flotation system. The biogas may be used to provide energy for one or more components of the wastewater treatment system and may provide enough energy for the system to operate in an energy neutral status. The biogas may also be used to provide salable energy to external entities or processes.

Aspects and embodiments of the present invention are directed toward systems and methods for treating wastewater. As used herein the term "wastewater" includes, for example, municipal wastewater, industrial wastewater, agricultural wastewater, and any other form of liquid to be treated containing undesired contaminants. Aspects and embodiments of the present invention may be utilized for primary wastewater treatment, secondary wastewater treatment, or both. Aspects and embodiments of the present invention may remove sufficient contaminants from wastewater to produce product water that may be used for, for example, irrigation water, potable water, cooling water, boiler tank water, or for other purposes.

Aspects and embodiments of the present invention are directed to a wastewater treatment system that comprises a membrane bioreactor (MBR). As noted above, MBR systems combine biological treatment, involving bacteria, with membrane separation to treat wastewater. Treated water is separated from the purifying bacteria (i.e., activated sludge), by a process of membrane filtration.

MBR systems used in wastewater treatment systems are typically designed or sized to deliver a targeted permeate output or effluent. In immersed membrane bioreactor systems, the membrane filter is immersed in an open tank containing the wastewater sludge stream to be filtered. Filtration is achieved by drawing water through the membranes under a vacuum. The transmembrane pressure (TMP), or pressure differential across the membrane, causes the water to permeate through the membrane walls. The filtered water or permeate is typically transferred to a downstream tank, reservoir or receiving stream. The suspended solids and other materials that do not pass through the membrane walls may be recycled or discharged for further treatment depending on the MBR system design.

Membrane fouling is one drawback of MBR systems because it significantly reduces membrane performance and membrane lifespan, leading to an increase in maintenance and operating costs. Membrane fouling in MBRs is attributable to suspended particulates (microorganisms and cell debris), colloids, solutes, and sludge flocs in the MLSS. These materials deposit onto the membrane surface and into the membrane pores, clogging the pores, and leading to a decline in the permeability of the membrane. MBR systems also have longer solid retention times (e.g., greater than 10 days) than ASPs, which results in high MLSS concentration values (e.g., greater than 10 g/L), which contributes to membrane fouling and reduced aeration efficiency (due to the increased mixed liquor suspended solids concentration).

Cleaning of the surface of the immersed membranes is achieved via air scouring by delivering a stream of air or gas bubbles under or near the bottom of the membrane filters. The rising air or gas bubbles scour the membrane surfaces to reduce fouling and maintain the desired or targeted permeation rate. The intensity and/or frequency of the air scouring process applied to the surface of the immersed membranes may depend on the rate of fouling. High MLSS values require high aeration rates to achieve adequate cleaning, and the energy required to provide this air scouring is a significant contributor to the overall energy consumption and operating costs of the MBR system.

Referring to FIG. 1, a wastewater treatment system 100 is described which is constructed in accordance with one or more embodiments of the present invention. Wastewater from a source of wastewater 105 is directed into a contact tank 110 through an inlet of the contact tank. In the contact tank 110, the wastewater is mixed with activated sludge recycled through a conduit 175 from a downstream membrane bioreactor process described below. According to some embodiments, wastewater may be mixed in the contact tank 110 with activated sludge that would otherwise be wasted or otherwise discharged from one or more biological processes in the wastewater treatment system. In some embodiments, the contact tank 110 is aerated with mechanical aerators or a source of aeration gas 153 to facilitate mixing of the wastewater and the activated sludge. According to various aspects, the mixing functions to transfer a desired amount of oxygen to the contact tank. The aeration gas may be an oxygen containing gas, for example, air. Suspended and dissolved organic materials, including dissolved solids, in the wastewater including oxidizable biological materials (referred to herein as Biological Oxygen Demand, or BOD) are absorbed/enmeshed/stored into the activated sludge (e.g., cells) in the contact tank, forming a mixed liquor. A portion of the BOD may also be oxidized in the contact tank 110. The residence time of the wastewater in the contact tank 110 may be sufficient for the majority of the BOD to be absorbed by the activated sludge, but not so long as for a significant amount of oxidation of the BOD to occur. In some embodiments, for example, less than about 30% of the BOD entering the contact tank 110 is oxidized in the contact tank. The residence time of the wastewater in the contact tank is in some embodiments from about 30 minutes to about one hour, in some embodiments, from about 45 minutes to about one hour, and in some embodiments, from about 30 minutes to about one hour. The residence time may be adjusted depending upon factors such as the BOD of the influent wastewater. A wastewater with a higher BOD may require longer treatment in the contact tank 110 than wastewater with a lower BOD.

The mixed liquor suspended solids (MLSS) concentration of the mixed liquor formed in the contact tank depends on several variables, including the properties of the inlet raw wastewater 105, as well as the application, operation, and system characteristics. According to one embodiment, the MLSS concentration of the mixed liquor formed in the contact tank is from about 400 mg/L to about 2500 mg/L.

A first portion of the mixed liquor formed in the contact tank 110 is directed into a dissolved air flotation (DAF) system 120 through conduit 114. The DAF system 120 (otherwise referred to herein as a "DAF unit") may include a vessel, tank, or other open or closed containment unit configured to perform a dissolved air flotation operation as described below. The DAF unit 120 may function as both a thickener and a clarifier. FIG. 1 illustrates a single DAF unit 120, but it is to be appreciated that multiple DAF units may be used and are within the scope of this disclosure. For example, according to some embodiments, two or more DAF units 120 operating in parallel may be used. Providing multiple DAF units may allow for the system to continue operation if one or more of the DAF units are taken out of service for cleaning or maintenance.

According to some embodiments, the DAF unit 120 may include a gas inlet 157 or may otherwise be fluidly coupled to a source of gas. For example, air or another gas may be dissolved in the mixed liquor under pressure before entering the DAF unit 120. The pressure may be released as the mixed liquor enters the DAF unit 120, resulting in the gas coming out of solution and creating bubbles in the mixed liquor. In some embodiments, instead of dissolving gas into the mixed liquor, a fluid, for example, water having a gas, for example, air, dissolved therein, is introduced into the DAF unit 120 with the mixed liquor. Upon the mixing of the mixed liquor and the gas-containing fluid, bubbles are produced. The bubbles formed in the DAF unit 120 adhere to suspended matter in the mixed liquor, causing the suspended matter to float to the surface of the liquid in the DAF unit 120, where it may be removed by, for example, a skimmer.

In some embodiments, the mixed liquor is dosed with a coagulant, for example, ferric chloride or aluminum sulfate prior to or after introduction into the DAF unit 120. The coagulant facilitates flocculation of suspended matter in the mixed liquor.

In the DAF unit 120 at least a portion of the solids present in the influent mixed liquor, including solids from the influent wastewater and from the recycled activated sludge, are removed by a dissolved air flotation process to produce an effluent having a lower concentration of dissolved and/or suspended solids and/or BOD than the influent mixed liquor from the contact tank 110. At least a portion of any oil that may be present in the mixed liquor may also be removed in the DAF unit 120. In some embodiments, between about 50% and about 80% of the suspended solids in the mixed liquor introduced into the DAF unit 120 is removed and between about 45% and about 60% of the BOD is removed. Removal of the BOD may include enmeshment and adsorption in the mixed liquor and/or oxidation of the BOD and the formation of reaction products such as carbon dioxide and water. In other embodiments, up to about 80% of the suspended solids is removed in the DAF unit 120 and up to about 60% of the BOD is removed.

The mixed liquor suspended solids (MLSS) concentration of the DAF effluent depends on several variables, including the properties of the inlet raw wastewater 105, as well as the application, and the DAF operating parameters such as the surface loading rate, the solid loading rate, and the pressurized recycle rate. According to one embodiment, the DAF effluent has a mixed liquor suspended solids (MLSS) concentration of less than 1250 mg/L. In another embodiment, the DAF effluent has an MLSS concentration of between about 100 mg/L and about 200 mg/L.

Suspended solids removed in the DAF unit 120 may be sent out of the system as waste solids through a conduit 125. These waste solids may be disposed of, or in some embodiments, may be treated in a downstream process, for example, an aerobic or anaerobic digestion process as described further below to produce useful products, for example, biogas and/or usable product water.

Effluent from the DAF unit 120 is directed through conduit 124 into a membrane bioreactor (MBR) 135, which may include a biological treatment vessel 130 and a membrane filtration unit 160 disposed within the biological treatment vessel 130. The biological treatment vessel 130 may include one or more treatment tanks. Aerator devices and/or mechanical mixers may be used in one or more tanks to provide oxygen and keep the fluid being treated in suspension. The tanks may be used to provide separate treatment conditions. As discussed in further detail below, one zone or region of the biological treatment vessel 130 may be configured as an aeration zone having a continuous oxygen deficit and a second zone or region of the biological treatment vessel 130 may be configured as an aeration zone having a continuous oxygen surplus. In some embodiments, the second zone having a continuous oxygen surplus may be positioned downstream from the first zone. The two zones may be located in the same tank, or in separate tanks. The nature and function of the MBR may be similar to that described in U.S. Pat. No. 7,713,413, which is herein incorporated by reference in its entirety for all purposes.

According to some embodiments, a second portion of the mixed liquor formed in the contact tank is directed into the membrane bioreactor 135 through a conduit 115. In some embodiments, about a half of the mixed liquor formed in the contact tank 110 is directed into the DAF unit 120 and about half of the mixed liquor formed in the contact tank 110 is directed through the conduit 115 into the membrane bioreactor 135. In other embodiments, between about one third and two thirds of the mixed liquor formed in the contact tank 110 is directed into the DAF unit 120 and the remainder of the mixed liquor formed in the contact tank 110 is directed through the conduit 115 into the membrane bioreactor 130. The amount of the mixed liquor directed into the DAF unit 120 as opposed to the membrane bioreactor 135 may be varied based upon such factors as the concentration of the mixed liquor and the effectiveness of the mixed liquor at enmeshing BOD in the contact tank 110. The discussion herein may refer to treatment of the DAF effluent in the MBR 135, but it is to be appreciated that treatment in the MBR 135 also applies to any mixed liquor from the contact tank 110 that is directed to the MBR 135.

For example, if it was desired to remove a greater, rather than a lesser amount of solids in the DAF unit 120, a greater fraction of the mixed liquor from the contact tank 110 would be directed to the DAF unit 120 when the mixed liquor had a lower, rather than a higher concentration of solids. Similarly, if it was desired to remove a greater, rather than a lesser amount of BOD in the DAF unit 120, a greater fraction of the mixed liquor from the contact tank 110 would be directed to the DAF unit 120 when the mixed liquor had a lesser, rather than a greater, effectiveness at enmeshing BOD in the contact tank 110.

The combination of the biological contact tank 110 and the DAF unit 120 offers a biologically enhanced primary treatment process that provides several advantages to the MBR 135, including a reduced organic load and reduced TSS values. One example of a system for providing such a primary treatment process is the CAPTIVATOR™ treatment system available from Evoqua Water Technologies LLC.

According to some embodiments, at least a portion of the mixed liquor formed in the contact tank 110 is combined with effluent from the DAF unit 120 and is treated in the membrane bioreactor 135, as discussed in further detail below. Membrane bioreactor systems combine biological treatment (i.e., a biological process), involving bacteria, with membrane separation (i.e., a physical process) to treat wastewater. Treated water is separated from the purifying bacteria, referred to as activated sludge, by a process of membrane filtration. Membrane bioreactors typically employ submerged hollow fiber membrane modules incorporated in a distributed flow reactor. Membrane modules of the membrane filtration unit 160 (also referred to herein as a "membrane operating system (MOS)") are immersed in the biological treatment vessel 130, and filtrate is collected through suction applied to the filtrate side of the membranes. The MBR 135 may retain undesirable species such as soluble inorganic or organic compounds on a first side of the membrane filter, while allowing the "treated" portion to pass through the membrane filter. The MBR 135 is configured to biologically treat or otherwise break down organic components of an effluent from the DAF unit 120 and mixed liquor from the contact tank 110 to form a biologically treated mixed liquor, which comprises activated sludge. The biological treatment performed in the MBR 135 can include anaerobic, anoxic, or aerobic treatment and may be directed at numerous types of treatment including, for example, nitrification-denitrification, removal of phosphorus or other nutrients, BOD removal, etc. In operation, the biologically treated mixed liquor is contacted with outer surfaces of the membranes of the membrane filtration unit 160, and a treated water (filtrate) is removed from lumens of the membranes. As mentioned above, use of the contact tank 110 and DAF unit 120 in combination with the MBR 135 reduces the organic load into the MBR 135. This benefit can be embodied by the ability to operate the membrane filtration unit 160 at a higher flux rate than an MBR system that is not outfitted with the contact tank and DAF unit. In some instances, an increase in the flux rate of up to 50% can be achieved. According to one example, when the MLSS concentration of the membrane filtration unit 160 is less than about 4000 mg/L, then the flux rate can increased by up to about 50% (as compared to an MBR without the contact tank and DAF).

The membrane modules used in the membrane filtration unit 160 include porous or semi-permeable membranes. The membranes may be positioned so as to be submerged during operation and may have any configuration suitable for a particular purpose, such as a sheet or hollow tube. The membrane may be formed of any material (natural or synthetic) suitable for a particular filtration process. According to some embodiments, the membrane is formed of polymeric hollow fibers, such as those made of polyvinylidene fluoride polymer. One non-limiting example of a membrane that may be used in the membrane filtration unit 160 is the MEMCOR® B40N hollow fiber membrane available from Evoqua Water Technologies LLC. According to certain embodiments, the membrane fibers have a pore size of from about 0.04 microns to 0.1 microns. In some embodiments, the membrane fibers have a pore size of 0.04 microns. In some embodiments air may be bubbled up via membrane blowers between the membrane fibers to scour the fibers and remove solids from the membrane surface.

As noted above, the membrane modules used in the membrane filtration unit 160 include porous or semi-permeable hollow fibers. The fibers may be fixed at each end in a header, and the lower header may have one or more holes (i.e., aeration openings) formed therein through which gas liquid flow may be introduced. The holes can be circular, elliptical or in the form of a slot. The fibers may be sealed at the upper or lower end and open at their upper or lower end to allow removal of filtrate, however, in some arrangements, the fibers can be open at both ends to allow removal of filtrate from one or both ends. The fibers may be arranged in cylindrical arrays or bundles, however other configurations can also be employed, e.g., square, hexagonal, triangular, irregular, and the like.

Multiple membranes may be positioned in one or more membrane modules within the membrane filtration unit 160. In some embodiments, the membrane module is suspended vertically within the biological treatment vessel 130, and in alternative embodiments, the module may be suspended horizontally, or in any other desired position. The membrane modules may have any shape and cross-sectional area suitable for use in a desired application, for example, square, rectangular or cylindrical. For example, membrane modules may be used such as those described in U.S. Pat. No. 6,872,305, which is incorporated herein by reference in its entirety. Multiple membrane modules may be positioned adjacent to one another or at predetermined positions within the membrane filtration unit 160. The membrane modules may be positioned at any angle, including vertical and horizontal, within the membrane filtration unit 160. In one embodiment, a plurality of membrane modules may be mounted to a module support rack to facilitate membrane maintenance and/or replacement.

The membranes may be cleaned during a cleaning process using one or more techniques. In some embodiments, a backwash process using filtrate and/or a gas physically cleans the membrane surface. Gaseous chlorine (or other suitable chemicals) can be used for scrubbing, disinfection, and enhancing the cleaning efficiency by chemical reaction at the membrane surface. The use of ozone, besides the similar effects mentioned for gaseous chlorine, has additional features, such as oxidizing disinfection by-product (DBP) precursors and converting non-biodegradable natural organic matter (NOM) to biodegradable dissolved organic carbon.

Non-limiting examples of MBR systems that can be utilized in accordance with one or more configurations disclosed herein include, but are not limited to, the MEMPULSE® membrane bioreactor system and the XPRESS™ MBR Packaged Wastewater system from Evoqua Water Technologies LLC.

Although not explicitly shown in the figures, the MBR 135 may include pipes and one or more pumps that may be used to introduce feed into the biological treatment vessel 130, apply a vacuum to the membrane filters of the membrane filtration unit 160, and withdraw filtrate from at least one end of the fiber membranes through the outlet 185. The vacuum may be applied to the fibers to withdraw filtrate while intermittently, cyclically, or continuously supplying gas bubbles through aeration openings (e.g., holes or slots in the membrane header) to within the membrane module such that, in use, the bubbles move past the surface of the membrane fibers to dislodge fouling materials therefrom. The gas bubbles may be entrained or mixed with a liquid flow when fed through the aeration openings. According to some embodiments, the aeration may be configured such that large gas bubbles may be randomly introduced or otherwise generated at the base of the module. The large bubbles or slugs increase in size as they move up the membrane fibers and function to prevent trash and solids build-up by pushing debris away from the surface of the membrane fiber. In addition, the aeration may be configured to create or otherwise generate an airlift flow that draws mixed liquor into the bottom of each membrane module through an airlift tube. The air bubbles may blend with mixed liquor and rise between the individual membrane fibers to create a crossflow that evenly distributes mixed liquor and reduces solids concentration on the membrane surface. The nature and function of an aeration device configured to produce these aeration effects may be similar to those described in U.S. Pat. No. 8,622,222, which is herein incorporated by reference in its entirety for all purposes.

According to some embodiments, wastewater treatment system 100 may also include a primary or pre-treatment filter. The primary filter may be used to filter influent wastewater 105 entering the system prior to treatment in the contact tank 110. A primary filter may also be used in the MBR 135 to filter feed water prior to entering the biological treatment regions of the MBR 135. The primary filter may be a rotary drum filter or rotary disc filter as known in the art.

Referring again to FIG. 1, in the MBR 135, the effluent from the DAF unit 120 and the mixed liquor from the contact tank 110 is biologically treated in the biological treatment vessel 130 to form biologically treated mixed liquor which is filtered through porous membranes of the membrane filtration unit 160 to produce a filtrate that exits the MBR 135 through filtrate outlet 185.

In some embodiments, biological treatment of the effluent from the DAF unit (otherwise referred to herein as "DAF effluent") and mixed liquor from the contact tank 110 in the membrane bioreactor 135 includes oxidation of BOD in the DAF effluent and mixed liquor. To this end, oxygen may be supplied to the DAF effluent in the MBR 135 by aeration with an oxygen containing gas 159, for example, air. In some embodiments, the MBR 135 is supplied with sufficient oxygen for aerobic conditions to be created in the MBR 135. In other embodiments, the amount of oxygen supplied is insufficient to meet the entire oxygen demand of the DAF effluent, and the MBR 135, or at least a portion thereof, may be maintained in an anoxic or anaerobic condition. Nitrification and denitrification of the DAF effluent may occur in different portions of the aerated MBR.

The residence time of the DAF effluent in the MBR 135 may be sufficient to oxidize substantially all BOD in the DAF effluent. According to some embodiments, the residence time (i.e., sludge retention time) for the DAF effluent in the MBR 135 may be less than 20 days. In other embodiments, the sludge retention time in the MBR 135 is less than 8 days. According to other embodiments, the sludge retention time in the MBR 135 is about 5 days or less. The sludge retention time may be a function of the BOD level of the incoming water to be treated. For instance, the sludge retention time may be increased if the influent wastewater to be treated and/or the biologically treated mixed liquor contains a high level of BOD or may be decreased if the influent wastewater to be treated and/or the biologically treated mixed liquor includes a low level of BOD.

DAF effluent that is biologically treated in the MBR 135 forms a biologically treated mixed liquor which is filtered through the membrane filtration unit 160 and is directed through outlet 185 as filtrate. According to some embodiments, the filtrate has a BOD value of less than 5 mg/L and a TSS value of less than 5 mg/L.

Activated sludge separated from the filtrate in the MBR 135 may be recycled back upstream to a wastewater inlet of the system, the source of wastewater, and/or the contact tank 110 through conduits 165 and 175. In some embodiments 100% of the activated sludge separated in the MBR 135 is recycled upstream. According to some embodiments, 100% of the recycled sludge may be directed to the contact tank 110 (or wastewater inlet) through conduit 175. In other embodiments, as discussed further below, at least a portion of the activated sludge separated in the MBR 135 may be directed to one or more zones or regions of the MBR 135.

In some embodiments, the membrane bioreactor 135 may comprise a contact stabilization vessel. A portion of the filtrate may be recycled (recycle system not shown in FIG. 1) to supply gas bubbles to the DAF unit 120. A gas may be dissolved into the recycled portion of effluent, which is then directed back into the DAF unit 120 and mixed with influent mixed liquor.

According to at least one embodiment, the wastewater treatment system 100 may further include an anaerobic treatment unit 140 (also referred to herein as an "anaerobic digester"). The anaerobic digester 140 may be utilized to treat mixed liquor, which may include suspended solids, sludge, and/or solids-rich or solids-lean fluid streams, from one or more other treatment units of the wastewater treatment system.

The anaerobic digester 140 of wastewater treatment system 100 is supplied with suspended solids removed from mixed liquor in the DAF unit 120 through conduit 125. The suspended solids from the DAF unit 120 are anaerobically digested in the anaerobic digester 140 to produce biogas 142 and anaerobically treated sludge 144. According to at least one embodiment, the biogas 142 generated by the anaerobic digestion process in the anaerobic digester 140 may be used to power one or more components of the wastewater treatment system 100. For example, energy may be harvested from the biogas 142 to power one or more mechanical devices, such as pumps, heaters, motors, aeration devices, etc. used in operating the wastewater treatment system 100. The biogas 142 may provide energy through combustion or through use in, for example, one or more fuel cells. In some embodiments, the generated energy is sufficient for the wastewater treatment system to operate in an energy neutral status. As used herein, the term "energy neutral" refers to the wastewater treatment system's ability to operate without utilizing external sources of energy.

The conditions used during the anaerobic digestion process may depend on a number of factors, including the type of bacteria utilized during the digestion process. For example, use of mesophilic bacteria typically requires operating temperatures of between about 20° C. and 45° C., while thermophilic bacteria typically require operating temperatures of between about 50° C. and 75° C. In certain embodiments, the operating temperature may be between about 25° C. and about 35° C. to promote mesophilic activity rather than thermophilic activity. Depending on the other operating parameters, in some embodiments the retention time in the anaerobic digester can be between about 15 and about 30 days retention time. In certain embodiments, anaerobic digestion of mixed liquor in the anaerobic digester may result in a reduction in oxygen demand of the mixed liquor of about 50%.

Although the examples described herein are discussed in the context of an anaerobic digestion process (i.e., absence of gaseous oxygen), it is to be appreciated that aerobic digestion processes are also within the scope of this disclosure (i.e., presence of gaseous oxygen).

According to one embodiment, a portion of the suspended solids removed from mixed liquor in the DAF unit 120 is recycled to the contact tank 110 through conduits 125 and 122. Conduit 122 may branch off of conduit 125 as illustrated, or may be connected to a third outlet of the DAF unit 120, in which case suspended solids removed in the DAF unit 120 are recycled back to the contact tank 110 through conduit 122 only. The amount of suspended solids recycled to the contact tank 110 may depend on a number of factors. The amount may be adjusted based on the efficiency of the removal of solids in the DAF unit 120 and/or the concentration of solids in the DAF unit 120. Recycling suspended solids from the DAF unit 120 to the contact tank 110 may function to enhance both BOD removal and biosorption in the mixed liquor formed in the contact tank 110. The amount of solids recycled from DAF unit 120 to the contact tank 110 may range from about 1% to about 100% of a total amount of solids removed from the mixed liquor in the DAF unit 120. The amount of solids recycled from DAF unit 120 to the contact tank 110 may be a majority of a total amount of solids removed from the mixed liquor in the DAF unit 120, for example, greater than about 50%, between about 50% and about 95%, or between about 60% and about 80% of the total amount of solids removed from the mixed liquor in the DAF unit 120.

DAF units are typically utilized in wastewater treatment systems to remove solids from the wastewater, thus reducing the need for biological treatment of these removed solids and reducing the energy requirements of the wastewater treatment system by, for example, reducing the amount of air needed to be supplied to an aerated biological treatment vessel to oxidize the removed solids. It is therefore counter to conventional operation of wastewater treatment systems to re-introduce floated solids separated from mixed liquor from a contact tank in a DAF unit back to the contact tank. Typically, after solids are separated from mixed liquor from a contact tank in a DAF unit, reintroducing the separated solids into mixed liquor in the contact tank and forcing the solids to go through the same separation process in the DAF unit again reduces the efficiency of the system. Such a solids recycle from a DAF unit to a contact tank directly upstream of the DAF unit would cause a need for a greater amount of contact tank capacity and a greater amount of DAF unit capacity. Such a solids recycle from a DAF unit to a contact tank directly upstream of the DAF unit would also require more air flow to the DAF unit to remove the recycled solids from the mixed liquor in addition to any solids that would be present in the absence of the solids recycle. It has been discovered, however, that benefits may be achieved by the counterintuitive re-introduction of solids removed in the DAF unit back into the contact tank of a wastewater treatment system from which mixed liquor is supplied to the DAF unit.

For example, by recycling the solids removed by the DAF unit 120 to the contact tank 110, the amount of total suspended solids (TSS) in the contact tank 110 may be increased as compared to methods not including a recycle of solids from the DAF unit 120 to the contact tank 110. The increased TSS level in the contact tank 110 may provide for additional soluble BOD to be adsorbed in the contact tank 110 as compared to a contact tank 110 having a lower level of TSS. In some embodiments, a desirable TSS level in the contact tank 110 may be between about 400 mg/L and about 3500 mg/L. In other embodiments, the TSS level in the contact tank 110 may be between about 1,200 mg/L and about 3,500 mg/L.

The removal of the additional soluble BOD in the contact tank 110 due to the higher TSS level in the contact tank 110, resulting from the recycle of solids from the DAF unit 120 to the contact tank 110, provides for the removal of this additional BOD as solids in the DAF unit 120. The additional BOD removed as solids in the DAF unit 120 may be directed to an anaerobic digester (for example, anaerobic digester 140 illustrated in FIGS. 1 and 2) rather than an aerated biological treatment unit (for example, MBR 135), thus reducing the need for aeration power in the MBR 135 and increasing the amount of biogas that could be produced in the anaerobic digester.

When supplied with recycled solids from the DAF unit 120, the contact tank 110 may have a hydraulic retention time (HRT) of between about 30 minutes and about one hour and a solids retention time (SRT) of between about 0.5 days and about one day to effectively adsorb soluble BOD. In other embodiments, the SRT in the contact tank 110 may be between about 0.5 and about 1.0 days. For example, according to one embodiment, when the contact tank 110 includes TSS in a range of between about 400 mg/L and about 2,500 mg/L, the SRT in the contact tank 110 may be between about 0.5 to about one day. According to another embodiment, when the contact tank 110 includes TSS in a range of between about 1500 mg/L and about 2500 mg/L, the SRT in the contact tank 110 may be between about 0.5 to about one day.

Recycling solids removed in the DAF unit 120 to the contact tank 110 provides for the contact tank 110 to function as a high rate activated sludge system while the DAF unit 120 function as a solids-liquid separator. Recycling solids removed in the DAF unit 120 to the contact tank 110 provides living bacteria capable of oxidizing BOD and increases the absorption efficiency than in systems where solids removed from the DAF unit 120 are not recycled to the contact tank. In systems and methods where solids removed in the DAF unit 120 are not recycled to the contact tank 110, oxidation of about 2% to about 3% of the BOD in wastewater influent to the contact tank 110 may be oxidized in the contact tank 110 and DAF unit 120. In contrast, for systems and methods where solids removed in the DAF unit 120 are recycled to the contact tank 110, oxidation of about 5% to about 10% of the BOD in wastewater influent to the contact tank 110 may be oxidized in the contact tank 110 and DAF unit 120. Recycling solids removed in the DAF unit 120 to the contact tank 110 may thus reduce the amount of BOD that needs to be treated in downstream unit operations, for example, in the MBR 135 discussed herein, thus reducing the power requirements for the downstream unit operations. The SRT of the contact tank 110 may be adjusted to optimize BOD removal of particulate, colloidal, and soluble BOD fractions.

In some embodiments, a portion of the DAF effluent is recycled to an inlet of the DAF unit 120 through conduit 155. As described above, the basic separation mechanism of the solid liquid separation process that takes place in the DAF unit 120 is achieved via dissolved air in a liquid stream under pressure. At the entrance of the DAF unit 120 the pressure is removed (i.e., the air is released at atmospheric pressure) via, for example, a pressure reduction valve, to allow the dissolved air to form micro-sized air bubbles. As these bubbles move toward the upper surface of the tank in the DAF unit 120 they attach or otherwise adhere to suspended solids particles in the wastewater and move them to the upper surface. The DAF effluent has a lower TSS concentration and can be utilized for creating a pressurized recycle stream for the DAF unit 120. Air via a source of compressed air is dissolved in a portion of the DAF effluent under pressure in a pressurizing tank of the DAF unit 120, which saturates the DAF effluent with air. This pressurized stream may then be used as a separation mechanism in the DAF unit 120.

Utilizing DAF units as described above in a wastewater treatment system provides several advantages over similar membrane bioreactor wastewater treatment systems operated without DAF units. Because the DAF units remove a significant portion of suspended solids from influent wastewater without the need for oxidation of these solids, the size of other components of the system, such as the membrane filtration unit and/or biological treatment vessel, may be reduced, resulting in a lower capital cost for the system. Since a lower amount of BOD enters the membrane bioreactor, in some instances the size (volume) of the membrane bioreactor may be reduced by a portion that is linear with the reduction in the amount of BOD that enters the membrane bioreactor. In addition, the reduced BOD allows for the MBR to operate at a higher flux rate, which reduces the total surface area required of the membranes. In some instances there is also a lesser requirement for oxygen in the membrane bioreactor, which allows for the capacity and power requirements of an aeration system in the membrane bioreactor to also be reduced, in some embodiments by about 30%. In other embodiments, the reduced BOD can allow for the MBR to operate at a lower flux rate (and lower MLSS), which reduces energy costs and chemical cleaning of the membranes.

In the embodiment illustrated in FIG. 1, and in the additional embodiments described below, it should be understood that the various conduits illustrated may be provided with, for example, pumps, valves, sensors, and control systems as needed to control the flow of fluids therethrough. These control elements are not illustrated in the figures for the sake of simplicity.

Figure 2:
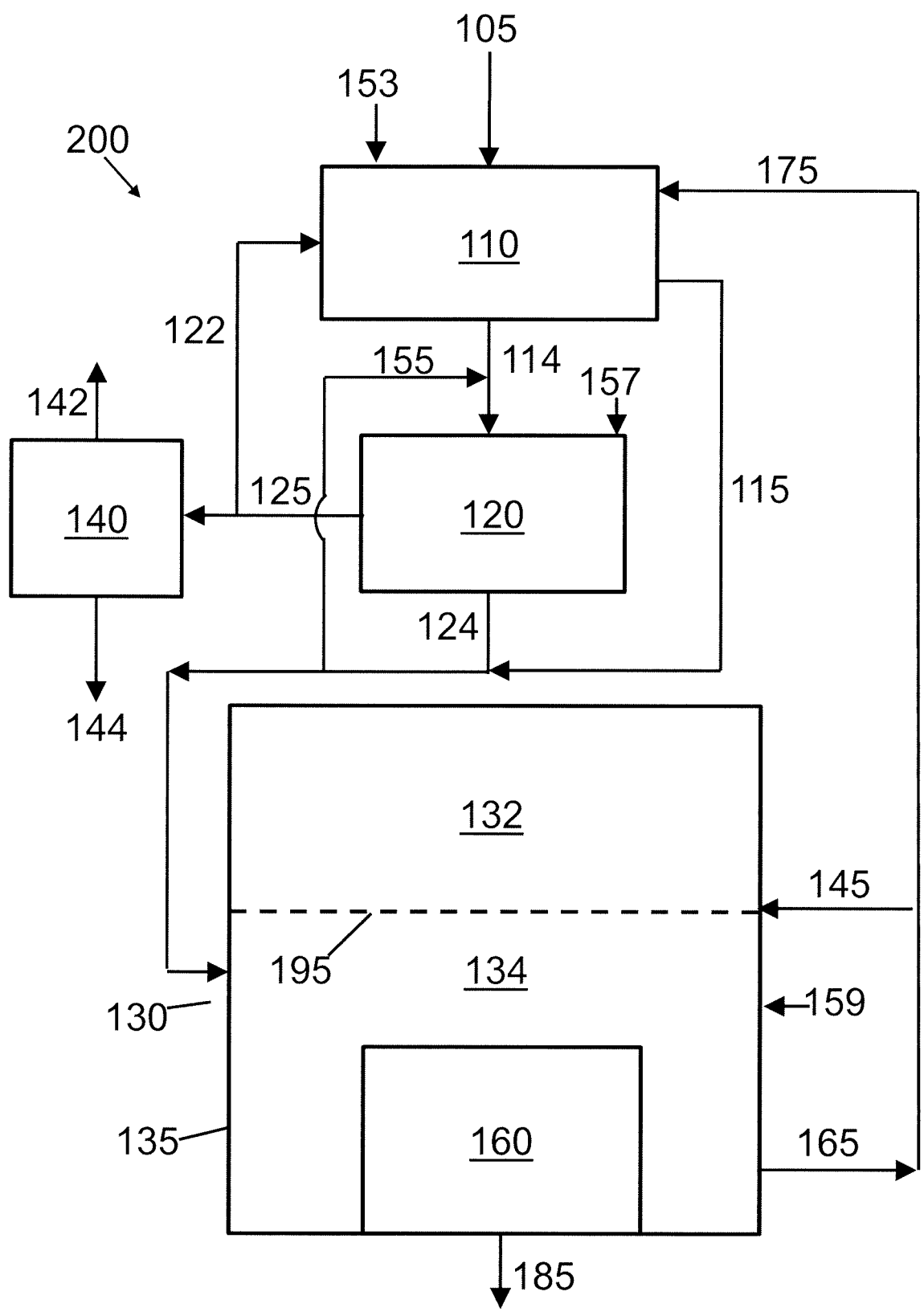
FIG. 2 is a block flow diagram of a wastewater treatment system in accordance with another embodiment of the present invention.

In another embodiment, indicated generally at 200 in FIG. 2, the MBR 135 includes an aerobic region 134 (also referred to herein as an "aerobic treatment region" or "aerobic zone") and an aerated anoxic region 132 (also referred to herein as an "aerated anoxic treatment region" or "aerated anoxic zone"). The aerobic region 134 is in fluid communication downstream of the aerated anoxic region 132 and receives biologically treated anoxic mixed liquor from the aerated anoxic region 132. In some embodiments the aerobic region 134 is fluidically connected to an outlet of the aerated anoxic region 132. The aerobic region 134 is configured such that sufficient oxygen is supplied via oxygen 159 supplied by an oxygen containing gas, such as air, to meet the oxygen demand of the DAF effluent (and any mixed liquor from the contact tank 110) (or biologically treated anoxic mixed liquor) and the aerobic region may be maintained in an aerobic condition. In contrast, the aerated anoxic region 132 is configured such that the amount of oxygen supplied is insufficient to meet the oxygen demand of the DAF effluent, and the aerated anoxic region may be maintained in an anoxic or anaerobic condition. Although not explicitly shown in FIG. 2, the aerated anoxic region 132 may also be supplied with oxygen containing gas, such as air.

The example MBR 135 shown in FIG. 2 includes the aerated anoxic region 132 and aerobic region 134, but it is to be understood that other embodiments may use an MBR with other types and other combinations of types of zones or treatment regions. For instance, at least one zone or region in the MBR may be configured as an anaerobic (i.e., absence of any common electron acceptor such as nitrate, sulfate, or oxygen), anoxic (i.e., absence of oxygen), and/or aerated (aerobic) zone.

In some embodiments, heterotrophic organisms oxidize BOD and autotrophic organisms oxidize ammonia in the aerated anoxic region 132. As the amount of oxygen supplied is less than the demand and nitrates from oxidation of ammonia are present, heterotrophic organisms will oxidize BOD using nitrates as an electron acceptor and converting nitrates into nitrogen gas. The hydraulic residence time in the aerated anoxic region 132 may be from about 2 to about 12 hours.

In certain embodiments, biologically treated anoxic mixed liquor from the aerated anoxic region 132 flows to the aerobic region 134, where there is a continuous oxygen surplus. According to some embodiments, most of the BOD and ammonia in the wastewater (DAF effluent and mixed liquor from contact tank) has been oxidized by the time the wastewater reaches the aerobic region 134, so dissolved oxygen concentrations of 1 mg/L or greater may be maintained in the aerobic zone. Oxidation of BOD and ammonia occurs in the aerobic zone 134. According to some embodiments, the hydraulic residence time in the aerobic zone 134 maybe from about 2 to about 12 hours. According to alternative embodiments, biologically treated aerobic mixed liquor from the aerobic region 134 flows to the aerated anoxic region 132.

Nitrification and/or denitrification of the DAF effluent in the MBR 135 may occur in different portions of the MBR 135. For instance, the aerated anoxic region 132 of the MBR 135 may be configured to promote nitrification, denitrification, or in some instances, simultaneous nitrification and denitrification processes. In some embodiments, and as discussed further below, activated sludge (i.e., a source of carbon) may be supplied to the aerated anoxic region 132 to assist in the denitrification processes. In certain embodiments, the aerobic region 134 may be configured to promote at least one of nitrification and denitrification processes. According to some embodiments, the aerobic region 134 is configured to promote nitrification processes.

According to some embodiments, the MBR 135 may further include a second anoxic zone or region that is positioned downstream from the aerobic region 134. This additional anoxic zone may be used in some instances to remove additional nitrates from the wastewater.

In some embodiments, the aerobic region 134 may be formed in a same vessel or tank as the aerated anoxic region 132 and separated therefrom by a partition 195, as indicated in FIG. 2. In other embodiments, the aerobic region 134 may be physically separate from the aerated anoxic region 132. For example, the aerobic region 134 and the aerated anoxic region 132 may occupy distinct vessels or tanks or may be otherwise separated from one another. In further embodiments the contact tank 110 may be combined with the aerated anoxic region 132 in the same tank. According to some embodiments, the membrane filtration 160 unit is disposed in the aerobic region 134, as shown in FIG. 2. In alternative embodiments, the membrane filtration unit 160 may be disposed in the aerated anoxic region 132.

In the system of FIG. 2 effluent from the DAF unit 120 is directed into the aerobic region 134 without first passing through the aerated anoxic region 132. In other embodiments, the effluent from the DAF unit 120 may be introduced into the aerated anoxic region 132 and then directed into the aerobic region 134.

According to some embodiments, at least a portion of the activated sludge separated in the MBR 135 may be recycled and directed back to one or more zones or regions, such as the aerated anoxic region 132 and/or aerobic region 134 of the MBR 135 through conduit 145. In certain embodiments, a portion of the activated sludge separated in the MBR 135 may be directed or otherwise introduced to the aerated anoxic region 132 of the MBR 135. In other embodiments, a portion of the activated sludge may be directed or otherwise introduced to the aerobic region 134 of the MBR. In certain embodiments the recycled sludge may be directed to any region of the MBR configured as an anaerobic, anoxic, or aerated region.

In accordance with some embodiments, between about 10% and about 20% of the recycled sludge is directed to the contact tank 110 through the conduit 175 and between about 80% and 90% of the recycled sludge is directed into MBR 135 through the conduit 145. According to other embodiments, between about 10% and about 90% of the recycled sludge may be directed to the contact tank 110, with the remainder directed into MBR 135. The amount of recycled sludge directed to the contact tank 110 through the conduit 175 may be set at a higher end of this range when the incoming wastewater has a high level of BOD and/or when the recycled sludge is less, rather than more, effective at enmeshing BOD in the contact tank 110. The amount of recycled sludge directed to the contact tank 110 through conduit 175 may be set at a lower end of this range when the incoming wastewater has a low level of BOD and/or when the recycled sludge is more rather than less effective at enmeshing BOD in the contact tank 110.

The amount of activated sludge which is recycled to the contact tank 110 and/or MBR 135 may also be adjusted based on a fraction of the mixed liquor from the contact tank 110 which is directed to the DAF unit 120 and the amount of activated sludge which is removed in the DAF units 120. The amount of activated sludge which is recycled to the contact tank 110 and/or MBR 135 may be an amount equal to or greater than an amount required to maintain a desired population of bacteria in the MBR 135 to perform biological treatment of DAF effluent within a desired timeframe and/or to protect against depletion of the bacterial population in the event of temporary disruptions in the operation of the treatment system. For example, the amounts of activated sludge which is recycled to the contact tank 110 or MBR 135 may be set such that sufficient bacteria containing solids are present in the MBR 135 to result in a solids retention time (SRT) of less than 8 days, about 5 days, or less than 5 days in the MBR 135. Similarly, an amount or fraction of the mixed liquor directed into the DAF unit 120 may be adjusted based on the amount of activated sludge recycled from the MBR 135, the efficiency of removal of solids in the DAF unit 120 and/or the concentration of one or more types of bacteria in the MBR 135 to, for example, establish or maintain a desired population of bacteria in the MBR 135.

The systems and components of embodiments of the invention may provide cost advantages relative to other wastewater treatment systems through the use of biological treatment processes in combination with anaerobic digestion. The wastewater treatment systems and processes of embodiments of the present invention may reduce sludge production through the use of various unit operations including aerobic and anaerobic biological processes as well as the use of recycle streams (e.g., recirculation of aerobic bacteria to the contact tank from the MBR and/or DAF unit). The wastewater treatment processes also overcome some of the technical difficulties associated with use of some anaerobic wastewater treatment processes, by, for example, concentrating or strengthening the sludge introduced into the anaerobic digester. Additionally, costs associated with use of a conventional aerobic stabilization unit are typically reduced because less aeration would typically be required in the aerobic processes due to the use of the anaerobic digester and various recycle streams. The various processes can also generate biogas such as methane as a product of the anaerobic digestion process, which can be used as an energy source.

In certain embodiments, a large portion of the chemical oxygen demand (COD) and BOD present in influent wastewater to be treated can be reduced using the anaerobic digester. This can reduce the aeration and oxygen requirements, and thus, operation costs of the wastewater treatment system, and increase the amount of methane produced that can be used as an energy source. Additionally, because anaerobic digestion can be used to reduce COD and BOD in the sludge, the sludge yield can also be reduced. The reduction of COD and/or BOD in the anaerobic treatment unit may also provide for a reduction in size of the stabilization tank or other aerobic treatment unit in the wastewater treatment system as compared to systems not utilizing the anaerobic digester.

Further embodiments may include any combination of features of the systems described above. For example, in some embodiments, a portion of the activated sludge from the MBR 135 is directed into an inlet of the DAF unit 120. According to some embodiments, a thickener, which may comprise, for example, a gravity belt thickener, may also be used in the system to separate an influent wastewater stream into a solids-lean effluent and a solids-rich effluent. For instance, a solids-rich output from a thickener may be directed to an inlet of the anaerobic digester, and the solids-lean output from the thickener may be directed to an inlet of the contact tank. Non-limiting examples of fluids that may be introduced to the thickener may include a solids-rich fluid stream from a primary clarifier positioned upstream from the anaerobic digester and/or activated sludge or other solids-rich retentate from the MBR. In some embodiments, a primary clarifier may be used and positioned upstream from the contact tank. The primary clarifier may be configured to separate wastewater, such as the source of wastewater 105 and/or one or more recycled stream in the system, into a solids-rich fluid stream and a solids-lean fluid stream. Furthermore, any of the above embodiments may include multiples of any of the treatment units and/or conduits illustrated.

According to various aspects, a method of facilitating may be provided. The method of facilitating may include or otherwise regard a party instructing the connection of the unit operations in the systems and methods described herein to achieve various functions, such as reducing a solids load to a membrane bioreactor, increasing flux in a membrane bioreactor, reducing a size of the membrane bioreactor, or reducing a surface area of the membranes.

EXAMPLES

Prophetic Example 1

In this prophetic example, a water treatment system was configured in a similar manner as illustrated in FIG. 1 with the biological treatment vessel 130 of the MBR 135 comprising a single tank.

Assumptions of Feed:

The system was fed wastewater at a rate of 58,000 gallons/day (gpd), 40 gallons per minute (gpm). The wastewater was assumed to be a high concentration municipal wastewater, having a total BOD (tBOD) of 330 mg/L (160 lbs/day) of which 59% (196 mg/L, 94 lbs/day) was particulate (pBOD), and 41% (135 mg/L, 66 lbs/day) was soluble BOD (sBOD). The wastewater was also assumed to include 380 mg/L (185 lbs/day) of total suspended solids (TSS), of which 138 lbs/day (286 mg/L VSS) was assumed to be volatile suspended solid material.

HDT Assumptions:

The hydraulic detention time (HDT) in the contact tank 110 was assumed to be 60 minutes and the hydraulic detention time (HDT) in the biological treatment vessel 130 of the MBR 135 was assumed to be 198 minutes.

Flow Rate Through Contact Tank:

Produced waste activated sludge (eWAS) including loss through the DAF unit 120 and the MBR 135 (approx. 51 lbs/day) was recycled to the contact tank 110 continuously at a rate of 0.5 gpm. via conduits 165 and 175. Providing a minimum of 0.03 lbs/lbs air to the solids ratio in the DAF unit 120 allows for 30% of the DAF effluent at a rate of 12 gpm to be recycled at 45 PSI via conduit 155.

From laboratory bench and pilot scale tests, as well a testing performed at a full size application in Pima County, Ariz., it was found that using the contact tank in combination with the DAF unit resulted in approximately 30% of the sBOD and approximately 55% total BOD was removed from influent wastewater.

Thus, it was assumed that in the contact tank 21 lbs/day of sBOD was converted to SS and 2 lbs/day of sBOD was oxidized. The total solids passed through the contact tank was thus 35 lbs/day recycled sludge+201 lbs/day suspended solids from influent wastewater+21 lbs/day sBOD converted to suspended solids (SS)−2 lbs pBOD oxidized=255 lbs/day. The mixed liquor suspended solids (MLSS) leaving the contact tank was thus ((255 lbs/day)/(58,610 gpd))=522 mg/L.

The tBOD leaving the contact tank was 160 lbs/day input−2 lbs/day oxidized=158 lbs/day. The sBOD leaving the contact tank was 65 lbs/day in−21 lbs/day converted to SS−2 lbs/day oxidized=42 lbs/day. The pBOD leaving the contact tank was 95 lbs/day influent+21 lbs/day converted from sBOD=116 lbs/day. This mixed liquor was directed to the DAF unit 120 via conduit 114.

BOD Influent to Biological Treatment Vessel:

The tBOD influent to the DAF unit was 158 lbs/day after oxidation of 2 lbs/day in the contact tank. The sBOD influent to the DAF unit was 42 lbs/day and pBOD was 116 lbs/day output from the contact tank with a flow rate of 58,610 gpd. Assuming 75% of the pBOD was removed in the DAF units, the tBOD flowing from the DAF unit to the biological treatment vessel 130 of the MBR 135 was (0.25*116 lbs/day pBOD)+42 lbs/day sBOD=71 lbs/day tBOD.

Solids in Biological Treatment Vessel of MBR

The biological treatment vessel 130 was sized to 10-11 days SRT to accommodate BOD loading of 71 lbs/day with 7,300-8,000 mg/L MLSS concentration. The volume of the biological treatment vessel was 1,059 ft$^3$ (7,925 gal). This volume resulted in a HDT in the biological treatment vessel of (7,925 gal/58,6100 gpd)(24 hr/day)=3.24 hours. The total solids in the biological treatment vessel was set at 500/550 lbs, for a total MLSS of 7,300-8,000 mg/L. Assuming a sludge yield of 65% of the BOD results in an amount of waste sludge produced in the biological treatment vessel of (0.65) (71 lbs/day tBOD)=46 lbs/day waste sludge. The waste sludge age would thus be (500 lbs total solids)/(46 lbs/day waste sludge)=10.8 days.

In another example, the biological treatment vessel 130 was sized to 10-11 days SRT to accommodate BOD loading of 71 lbs/day with 3,650-4,000 mg/L MLSS concentration. The volume of the biological treatment vessel was 2,118 ft$^3$ (15,850 gal). This volume resulted in a HDT in the biological treatment vessel of (15,850 gal/58,6100 gpd)(24 hr/day) =6.49 hours. The total solids in the biological treatment vessel was set at 500/550 lbs, for a total MLSS of 3,650-4,000 mg/L. Assuming a sludge yield of 65% of the BOD results in an amount of waste sludge produced in the biological treatment vessel of (0.65) (71 lbs/day tBOD)=46 lbs/day waste sludge. The waste sludge age would thus be (500 lbs total solids)/(46 lbs/day waste sludge)=10.8 days.

Biological Treatment Vessel Oxygen Requirements:

It was assumed that 0.98 lbs of oxygen were required to oxidize a pound of BOD and 4.6 lbs of oxygen were required to oxidize a pound of ammonia. The oxygen requirement of the biological treatment vessel was thus (0.98 lbs $O_2$/lb BOD) (71 lbs tBOD/day)+(4.6 lbs $O_2$/lb ammonia)(20 lb/day ammonia)=162 lb/day $O_2$ (3 lb $O_2$/hr). Using a FCF (Field Correction Factor—a correction factor to compensate for the reduced oxygen absorbing ability of mixed sludge in the biological treatment tank as opposed to clean water) of 0.5, this results in a specific oxygen utilization rate (SOUR) of 6 lbs $O_2$/hr. Assuming diffused air was supplied to the biological treatment vessel from a aeration system submerged by 13 feet and a 9% oxygen transfer capability (OTE), the biological treatment vessel would require a flow of (6.75 lbs $O_2$/hr)(1/0.09)(1/60 hour/min)(1/1.429 l/g $O_2$) (453.6 g/lb)(0.035 ft$^3$/l)=13.8 ft$^3$/min (scfm), or if aerating with air with approximately 20% $O_2$, 70 scfm.

MOS System:

For sustained flow 3,650-4,000 mg/L MLSS concentration a sustained flow membrane flux of 22.1 gfd at 20 degrees C. is possible. This creates a requirement of 6.1 membrane modules for effective treatment (based on a membrane system that uses modules (or Small Membrane Sub Unit SMSU) with 430.6 ft$^2$ of membrane area per module).

The membrane modules are arranged into "racks" (Large Membrane Sub-Units LMSU) of four to sixteen modules. In this example, the total scour air requirement is 14.4 ACFM, with a "peak" air flow of 21 ACFM.

With the system configured to operate at a lower MLSS, the solids mass loading on the membrane is reduced, thereby increasing the critical flux of the membrane by up to 50% (if the increase in flux is not captured and embodied as reduced membrane area instead). Another example allows for the possibility to reduce the scour air by 30%, which reduces the required air at average from 24 ACFM (see control example MBR in Prophetic Example 2 below) to 17 ACFM.

The membrane system requires a mixed-liquor recirculation flow into the membrane tank of 0.5 to 2 times the inlet flow (0.5 Q-2 Q).

Typical membrane cleaning intervals for Recovery Cleaning (RC) would be 180-360 days.

Solids Wasted:

Solids wasted in the DAF unit: 191 lbs/day (assuming 100% efficiency).

With the addition of the contact tank+DAF to the treatment system in the above example, the amount of tBOD to be treated in the biological treatment vessel was reduced from 160 lbs/day to 71 lbs/day, a reduction of 55%. This provided for a reduced required amount of membrane (i.e., surface area) for liquid separation in the MBR or a reduced flux rate of filtrate through the membranes as well as reducing the amount of chemicals used for cleaning the membranes (compared to an MBR system that does not include the contact tank+DAF pre-treatment process). This translates into a cost savings in terms of capital costs, for a reduced size of the biological treatment vessel and a reduced amount of required membrane surface area and required aeration from an aeration system, as well as cost savings in terms of operating costs, by reducing the amount of cleaning chemicals and aeration required to operate the system.

Prophetic Example 2

This example is included to provide a source of comparison to the example provided above with a wastewater treatment system that includes an MBR but does not include the contact tank or DAF unit as described herein.

The membrane operating system (MOS) of the MBR was sized based on a sustained filtrate (permeate) flow of 58,000 gallons/day (gpd), 40 gallons per minute (gpm). For sustained flow, a membrane flux of 14.7 gfd (gallons per square foot of membrane per day) at 20 degrees C. is desirable with 7,300-8,000 mg/L MLSS concentration. This creates a requirement for 3,946.6 ft$^2$ of membrane area for effective treatment. The membrane system uses modules (or Small Membrane Sub Unit SMSU) with 430.6 ft$^2$ of membrane area per module, so the system would require a minimum of 9.2 membrane modules for effective treatment.

The membrane modules are arranged into "racks" of four to sixteen modules. For this application two racks of five modules each would be used to achieve the minimum membrane area. Each module requires 2.4 ACFM of air at the point of discharge, so the total air requirement for the system would be 24 ACFM, with a "peak" air flow of 35 ACFM.

The membrane system requires a mixed-liquor recirculation flow into the membrane tank of 3.5 to 4 times the inlet flow (3.5 Q-4 Q). Considering that 1 Q of filtrate is leaving the tank through the membranes, the recirculation pumps returning mixed liquor to the bioreactor should be sized for at least 161 gpm.

Typical membrane cleaning intervals are every 3 to 7 days for Maintenance Cleaning (MC) and every 90 to 180 days for Recovery Cleaning (RC).

Example 3

Figure 3:
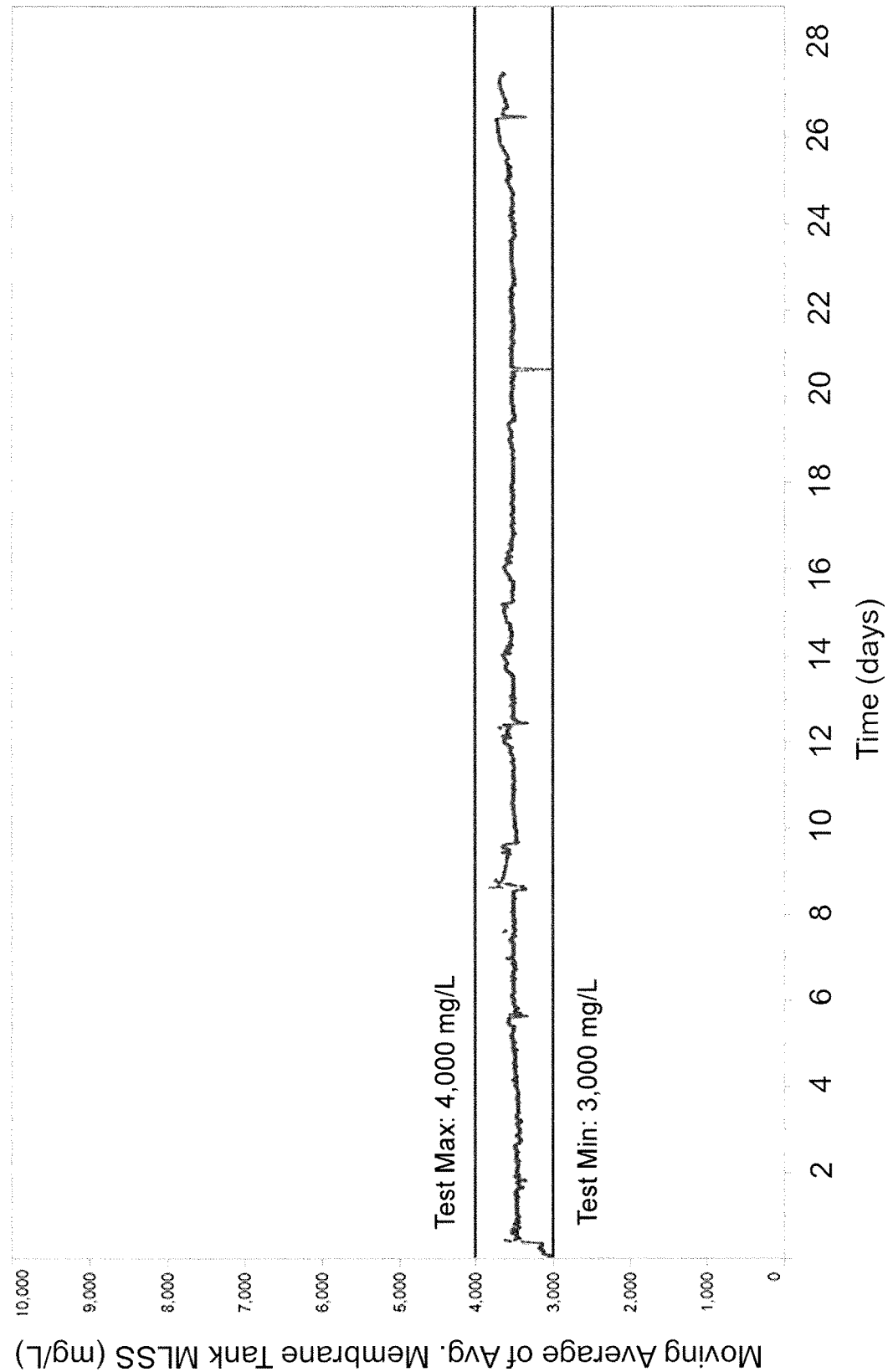
FIG. 3 illustrates MLSS results data of a pilot test of a system in accordance with an embodiment of the present invention.
Figure 4:
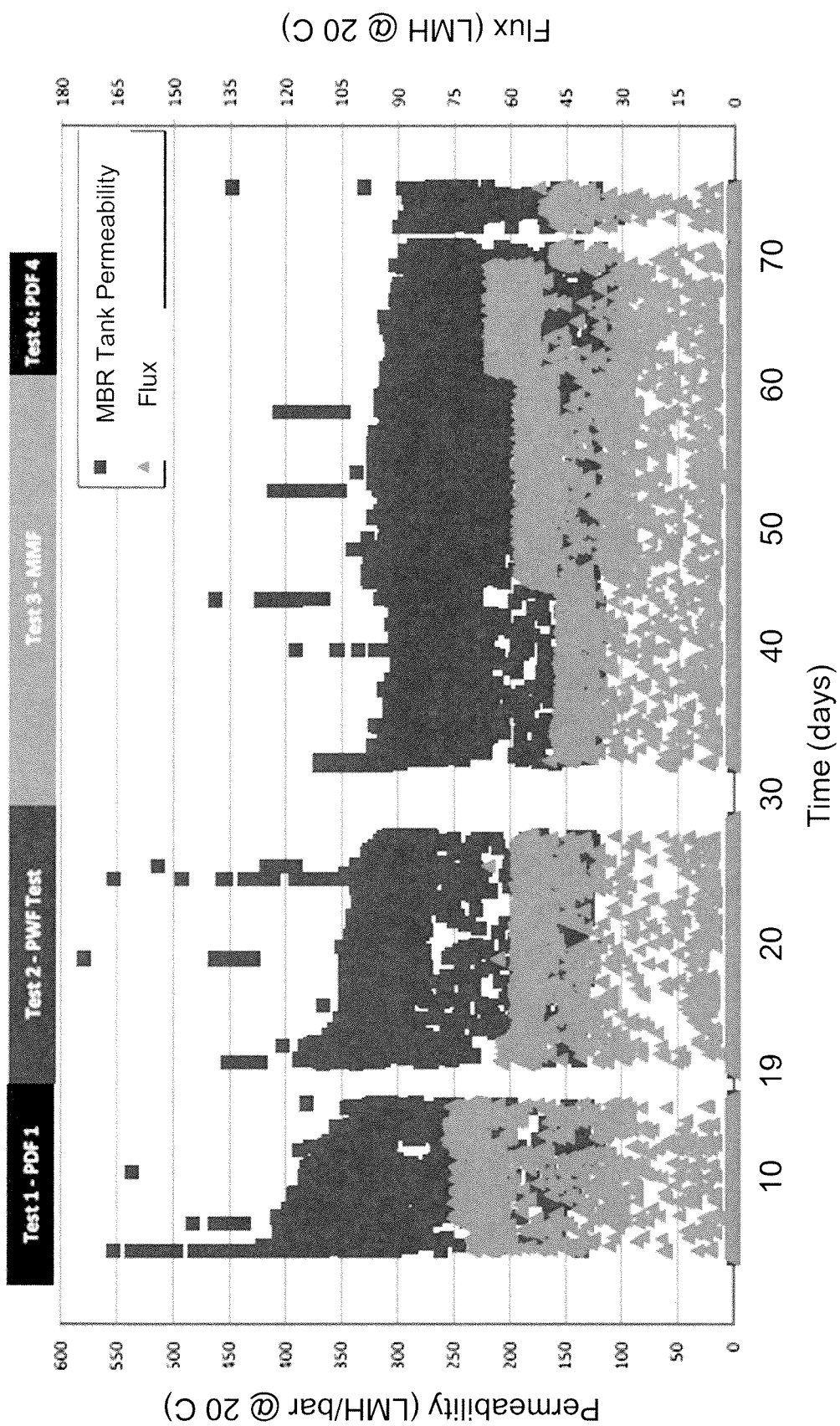
FIG. 4 illustrates permeability and flux rate results data of a pilot test of a system in accordance with an embodiment of the present invention.

A pilot plant trial was performed using a contact tank, DAF unit, and MBR as configured in a substantially similar manner as the system of FIG. 1 and using influent wastewater from an existing municipal wastewater treatment plant. FIG. 3 illustrates the input MLSS concentration for the membrane filtration unit over an approximate 27 day period. As shown in FIG. 3, the MLSS concentration was between 3000 mg/L and 4000 mg/L, with an approximate average about 3500 mg/L, which is lower than an MBR would operate in absence of the contact tank and DAF unit. FIG. 4 illustrates the membrane permeability and flux rate data from tests performed over an approximate 70 day period. Depending on the test being performed, the flux rate was less than about 75 LMH (liter/m$^2$/hour) and greater than about 30 LMH. In all instances, the flux rate was higher than an MBR operated in the absence of the contact tank and DAF unit. In this instance, with the MLSS concentration below 4000 mg/L the flux rate increased by up to 50% as compared to an MBR operated without the contact tank and DAF unit.

The aspects disclosed herein in accordance with the present invention are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A wastewater treatment system comprising:
    a contact tank having a first inlet configured to receive wastewater to be treated, a second inlet, and an outlet, the contact tank configured to mix the wastewater to be treated with activated sludge to form a mixed liquor;
    a dissolved air flotation unit having an inlet in fluid communication with the outlet of the contact tank, a first outlet, and a second outlet; and
    a membrane bioreactor including:
        a biological treatment vessel having a first inlet in fluid communication with the first outlet of the dissolved air flotation unit,
        a second inlet,
        an activated sludge outlet in fluid communication with the second inlet of the contact tank, and
        a membrane filtration unit disposed within the biological treatment vessel, the membrane filtration unit comprising a plurality of porous membranes and a filtrate outlet, the membrane bioreactor configured to biologically treat organic components of an effluent from the dissolved air flotation unit to form a biologically treated mixed liquor and filter the biologically treated mixed liquor to produce a filtrate.

2. The system of claim 1, wherein the contact tank further comprises a second outlet in fluid communication with the second inlet of the membrane bioreactor.

3. The system of claim 2, wherein the membrane bioreactor includes an aerated anoxic treatment region and an aerobic treatment region.

4. The system of claim 3, wherein the first inlet of the membrane bioreactor is configured to deliver the effluent from the dissolved air flotation unit to the aerobic treatment region.

5. The system of claim 4, wherein the second inlet of the membrane bioreactor is configured to deliver a portion of the mixed liquor from the contact tank to the aerated anoxic treatment region.

6. The system of claim 3, wherein the aerobic treatment region is fluidically connected to an outlet of the aerated anoxic treatment region.

7. The system of claim 6, wherein the membrane filtration unit is disposed in the aerobic treatment region.

8. The system of claim 1, further comprising an anaerobic digester having an inlet in fluid communication with the second outlet of the dissolved air flotation unit, a first outlet, and a second outlet, the anaerobic digester configured to anaerobically digest a first portion of suspended matter from the dissolved air flotation unit to form a biogas and anaerobically treated sludge.

9. The system of claim 8, wherein the second outlet of the dissolved air flotation unit is in fluid communication with a third inlet of the contact tank, the dissolved air flotation unit being configured to deliver a second portion of the suspended matter to the third inlet of the contact tank.

10. The system of claim 8, configured to operate utilizing energy generated from the biogas.

11. The system of claim 1, wherein a total surface area of the plurality of porous membranes to produce a given flux of filtrate is reduced as compared to a total surface area of a plurality of porous membranes of a membrane filtration unit in a substantially similar wastewater treatment system not comprising the contact tank and the dissolved air flotation unit.

12. The system of claim 1, wherein a volume of the membrane bioreactor is reduced as compared to a substantially similar wastewater treatment system not comprising the contact tank and the dissolved air flotation unit.

13. The system of claim 1, wherein the membrane bioreactor is configured to have a sludge retention time of less than 20 days.

14. The system of claim 1, further comprising a recycle conduit providing fluid communication between the first outlet of the dissolved air flotation unit and the inlet of the dissolved air flotation unit and configured to recycle effluent of the dissolved air flotation unit to the inlet of the dissolved air flotation unit.

15. The system of claim 1, wherein the contact tank is maintained under aerobic conditions.

16. A method of treating wastewater in a wastewater treatment system, the method comprising:
   introducing the wastewater into a contact tank including an activated sludge;
   mixing the wastewater with the activated sludge in the contact tank to form a mixed liquor;
   directing a first portion of the mixed liquor to a dissolved air flotation unit;
   separating the mixed liquor in the dissolved air flotation unit to form a dissolved air flotation unit effluent and separated biosolids;
   directing the dissolved air flotation unit effluent to a membrane bioreactor;
   biologically treating the dissolved air flotation unit effluent in the membrane bioreactor to form a biologically treated mixed liquor;
   filtering the biologically treated mixed liquor in the membrane bioreactor to form a filtrate and an activated sludge; and
   recycling a first portion of the activated sludge to the contact tank.

17. The method of claim 16, further comprising directing a second portion of the mixed liquor into the membrane bioreactor and biologically treating the second portion of the mixed liquor with the dissolved air flotation unit effluent to form the biologically treated mixed liquor.

18. The method of claim 17, wherein the membrane bioreactor includes an aerated anoxic treatment region and an aerobic treatment region and the method further comprises directing the effluent from the dissolved air flotation unit to the aerobic treatment region.

19. The method of claim 18, further comprising directing a portion of the mixed liquor from the contact tank to the aerated anoxic treatment region.

20. The method of claim 18, further comprising treating the effluent from the dissolved air flotation unit in the aerobic treatment region to form a biologically treated aerobic mixed liquor and directing the biologically treated aerobic mixed liquor to the aerated anoxic treatment region.

21. The method of claim 20, further comprising treating the biologically treated aerobic mixed liquor in the aerated anoxic treatment region to form the biologically treated mixed liquor.

22. The method of claim 16, further comprising treating a first portion of the separated biosolids in an anaerobic digester to produce a biogas and an anaerobically treated sludge.

23. The method of claim 22, further comprising recycling a second portion of the separated biosolids to the contact tank.

24. The method of claim 22, further comprising generating energy from the produced biogas.

25. The method of claim 24, further comprising powering one or more components of the wastewater treatment system with the generated energy.

26. The method of claim 25, wherein the generated energy is sufficient for the wastewater treatment system to operate energy neutral.

27. The method of claim 16, wherein recycling the first portion of the activated sludge to the contact tank results is in an amount sufficient to reduce a total surface area of a plurality of porous membranes of the membrane filtration unit to produce a given flux of filtrate as compared to a total surface area of a plurality of porous membranes of a membrane filtration unit in a substantially similar method of treating wastewater that does not comprise recycling the first portion of the activated sludge to the contact tank.

28. The method of claim 16, further comprising recycling a portion of the dissolved air flotation unit effluent to the dissolved air flotation unit.

29. The method of claim 16, wherein the dissolved air flotation unit effluent is biologically treated for a retention time of less than 20 days.

* * * * *